US008381988B2

(12) United States Patent
Lister et al.

(10) Patent No.: US 8,381,988 B2
(45) Date of Patent: Feb. 26, 2013

(54) SECURITY DEVICES

(75) Inventors: Adam Lister, Hampshire (GB); Lawrence Commander, Reading (GB)

(73) Assignee: De La Rue International Limited, Hampshire (GB)

( * ) Notice: Subject to any disclaimer, the term of this patent is extended or adjusted under 35 U.S.C. 154(b) by 280 days.

(21) Appl. No.: 12/743,201

(22) PCT Filed: Oct. 31, 2008

(86) PCT No.: PCT/GB2008/003687
§ 371 (c)(1),
(2), (4) Date: May 14, 2010

(87) PCT Pub. No.: WO2009/066048
PCT Pub. Date: May 28, 2009

(65) Prior Publication Data

US 2010/0270379 A1 Oct. 28, 2010

(30) Foreign Application Priority Data

Nov. 19, 2007 (GB) .................................. 0722687.1

(51) Int. Cl.
*G06K 19/00* (2006.01)

(52) U.S. Cl. ....................................................... 235/487

(58) Field of Classification Search ................... 235/487
See application file for complete search history.

(56) References Cited

U.S. PATENT DOCUMENTS

| | | | |
|---|---|---|---|
| 4,186,943 A | 2/1980 | Lee | |
| 2003/0179364 A1 | 9/2003 | Steenblik et al. | |
| 2007/0216518 A1 | 9/2007 | Hoffmuller | |
| 2008/0259416 A1 * | 10/2008 | Peters et al. | 359/2 |

FOREIGN PATENT DOCUMENTS

| | | |
|---|---|---|
| CN | 1950217 A1 | 7/2007 |
| EP | 1047549 | 3/2003 |
| EP | 1642748 A1 | 5/2006 |
| GB | 2416738 | 2/2006 |
| GB | 2438383 | 11/2007 |
| GB | 2438384 | 11/2007 |
| JP | 2004191442 | 7/2004 |
| KR | 1020060028440 A1 | 3/2006 |
| WO | WO 2005/052650 | 6/2005 |
| WO | 2005105475 A1 | 10/2005 |
| WO | WO 2005/105474 | 11/2005 |
| WO | WO 2006/087138 | 8/2006 |

* cited by examiner

*Primary Examiner* — Kristy A Haupt
(74) *Attorney, Agent, or Firm* — Gable Gotwals

(57) ABSTRACT

The present invention relates to improvements in security devices that can be used in varying shapes and sizes for various authenticating or security applications, and in particular to an optically variable security device utilizing colorshift materials. The security device (10) comprises a first and a second layer (11*a*, lib) of a colorshifting material at least partially overlying each other and each having different colorshifting properties. At least partially applied over surface of one of the colorshifting layers is a light control layer (12) having a surface structure which modifies the angle of reflected light, such that light reflected by the security device is seen at a different viewing angle.

60 Claims, 7 Drawing Sheets

SECURITY DEVICES

CROSS-REFERENCE TO RELATED APPLICATIONS

This application is the United States National Phase of PCT Patent Application No. GB2008/003687 filed on 31 Oct. 2008, which claims priority to United Kingdom Patent Application No. 0722687.1 filed 19 Nov. 2007, both of which are incorporated herein by reference.

The present invention relates to improvements in security devices that can be used in varying shapes and sizes for various authenticating or security applications, and in particular to an optically variable security device utilising colourshift materials.

The increasing popularity of colour photocopiers and other imaging systems and the improving technical quality of colour photocopies has led to an increase in the counterfeiting of banknotes, passports and identification cards and the like. There is, therefore, a need to add additional authenticating or security features to existing security features. Steps have already been taken to introduce optically variable features into substrates used in such documentation that cannot be reproduced by a photocopier. There is also a demand to introduce features which are discernible by the naked eye but which are "invisible" to, or viewed differently, by a photocopier. Since a photocopying process typically involves scattering high-energy light off an original document containing the image to be copied, one solution would be to incorporate one or more features into the document which have a different perception in reflected and transmitted light, an example being watermarks and enhancements thereof.

It is known that certain liquid crystal materials exhibit a difference in colour when viewed in transmission and reflection, as well as an angularly dependent coloured reflection. Liquid crystal materials have been incorporated into security documents, identification cards and security elements with a view to creating distinctive optical characteristics. EP-A-0435029 is concerned with a data carrier, such as an identification card, which comprises a liquid crystal polymer layer or film in the data carrier. The liquid crystal polymer is solid at room temperature and is typically held within a laminate structure. The intention is that the liquid crystal layer, which is applied to a black background, will demonstrate a high degree of colour purity in the reflected spectrum for all viewing angles. Automatic testing for verification of authenticity is described using the wavelength and polarization properties of the reflected light in a single combined measurement. This has the disadvantage of being optically complex using a single absolute reflective measurement requiring a uniform liquid crystal area on a black background.

AU-A-488,652 is also concerned with preventing counterfeit copies by introducing a distinctive optically-variable feature into a transparent window security element. This document discloses the use of a liquid crystal "ink" laminated between two layers of plastic sheet. The liquid crystal is coated on a black background so that only the reflected wavelengths of light are seen as a colour. The security feature is primarily provided by thermochromic liquid crystal materials, which have the characteristic of changing colour with variation in temperature.

Liquid crystal materials can be incorporated into security devices either as a film, as for example in WO-A-03061980, or in the form of an ink as a liquid crystal pigment in an organic binder, as for example in EP-A-1156934. The advantage of a liquid crystal ink is that it can be applied using conventional printing processes and therefore it is relatively straightforward to apply the liquid crystal material in the form of a design. However the colour purity, brightness and sharpness of the observed colour and colourshift are significantly degraded for a pigmented liquid crystal ink compared to a liquid crystal film. This degradation is due to the variability in alignment of the cholesteric helical axis between the individual liquid crystal pigments compared to the uniform alignment of the liquid crystal film.

In the prior art the visual appearance of multilayer security devices utilising liquid crystal films have been customised by the incorporation of additional layers prior to the device being applied to the substrate. For example, in EP-A-0435029 a security device is customised by applying a black printed image under the liquid crystal layer. In WO-A-03061980 a liquid crystal security thread is customised by the introduction of demetallised characters using a dark resist. WO-A-03061980 discloses a method of manufacturing a security substrate, which combines the use of demetallised indicia with the colourshift effect of liquid crystal materials.

The afore-mentioned prior art documents describe security devices comprising single layer liquid crystal films. The fact that the reflected light from a liquid crystal film is over a narrow band of wavelengths, which is a function of the pitch of its helical structure, limits the range of colours available for the security devices of the prior art cited above to substantially pure spectral colours. In addition the colourshift exhibited by a liquid crystal film is always from a colour with a long wavelength to a colour with a shorter wavelength, for example red to green, as the an angle of incidence is increased away from normal incidence.

A method of increasing the range of available colours in liquid crystal films is described in U.S. Pat. No. 4,893,906, in which two or more liquid crystal coatings are overlaid to obtain new colours as a result of the colour additive properties of the liquid crystal coatings which do not absorb light. WO-A-2005105474 describes a security device comprising two superimposed cholesteric liquid crystal layers in which the additive mixing of the colours permits a wider range of colourshift effects. In some of the embodiments in WO-A-200510546 regions exhibiting different colourshifting effects are created by a partial application of one of the liquid crystal layers in localised areas. A partial application of a liquid crystal film is not straightforward and increases significantly the complexity of the production process compared to simply applying one uniform film over a second uniform film.

It is also well known in the prior art to use thin film interference structures, multilayer polymeric structures and photonic crystal structures to generate angularly dependent coloured reflection. Examples of security devices utilising thin film interference structures are described in U.S. Pat. No. 4,186,943 and US-A-20050029800 and examples of security devices utilising multilayer polymeric structures are described in EP-A-1047549.

The use of prismatic films to generate optical security devices is also well known in the art and examples are described in EP-A-1047960, U.S. Pat. No. 5,591,527, WO-A-03055692 and WO-A-04062938. A further example is described in WO-A-2006095160 which describes a security device having two regions, each comprising a prismatic surface structure defining different arrays of planar facets. Each region forms a reflector such that, on viewing the device at different viewing angles, the device will switch from being totally reflecting in areas of the first array which have a bright metallic appearance, and totally transparent in areas of the second array. If the device is tilted further, the inverse occurs.

The object of the present invention is to modify the appearance of conventional colourshifting materials, such as liquid crystal materials, by using a light control film, such as a microprismatic film, over the top of the colourshifting material. A further object is to extract more colours from such conventional colourshifting materials.

The invention therefore comprises a security device comprising a layer of colourshifting material; and applied to a first surface of the colourshifting layer a light control layer having a surface structure which modifies the angle of reflected light, such that light reflected by the security device is seen at a different viewing angle.

Preferred embodiments of the present invention will now be described, by way of example only, with reference to the accompanying drawings, in which:—

Figure 18A:
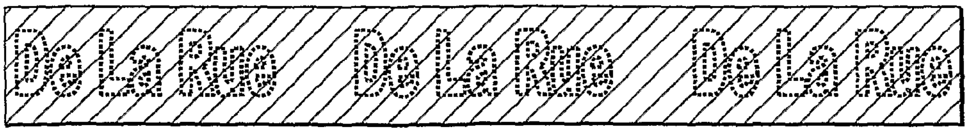
Figure 18B:
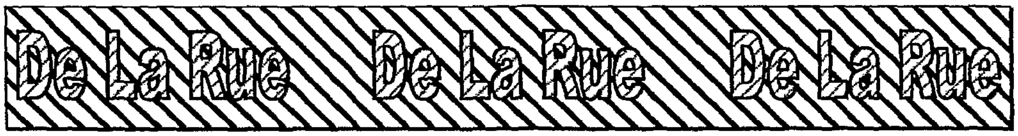
Figure 19:
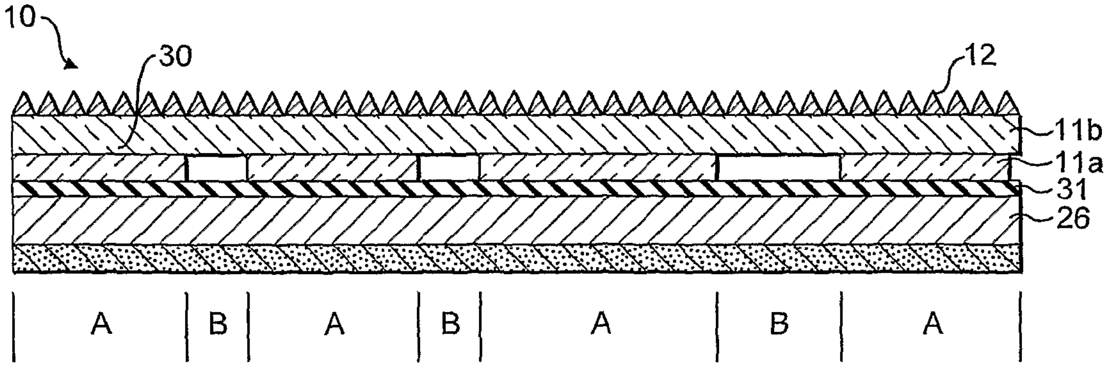

FIGS. 18*a* and 18*b* are plan views of a section of a further alternative security device according to the invention; and FIG. 19 is a cross-sectional side elevation of a still further alternative security device according to the invention.

Figure 1:
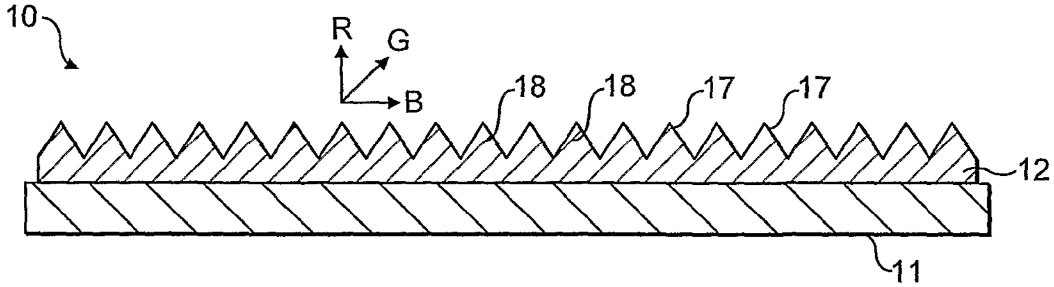
FIG. 1 is a cross-sectional side elevation of a security device according to the present invention.

The security device 10 according to the invention comprises at least one layer 11 of a colourshifting material 11, over which is applied a light control layer 12, so that the layers 11, 12 are in intimate contact, as shown in FIG. 1. Another layer may be included between layers 11 and 12, such as a layer of primer or adhesive, which preferably has a refractive index similar to that of the light control layer 12.

Although all types of colourshifting materials may be used in the present invention, including inter alia thin film interference structures, multilayer polymeric structures and photonic crystal structures, a particularly suitable material for the colourshifting layer 11 is a liquid crystal film. The invention is also not limited to the use of films and the liquid crystal layer 11, for example, can be provided by a pigmented liquid crystal coating applied to a carrier strip of a suitable polymeric substrate such as Polyethylene Terephthalate (PET) or Bi-axially oriented polypropylene (BOPP).

When light strikes the colourshifting layer 11, some of the light is reflected. The wavelength of the reflected light depends on the structure and composition of the colourshift material and the reflected light will appear coloured. The wavelength of the reflected light is also dependent on the angle of incidence, which results in a colour change perceived by the viewer as the colourshift layer is titled.

Figure 2:
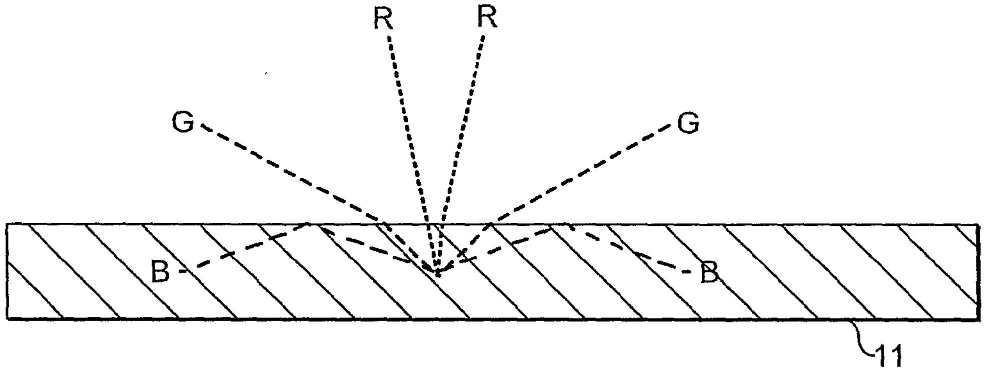
FIG. 2 is a cross-sectional side elevation of a simple layer of liquid crystal material showing the typical reflection of light rays.
Figure 3:
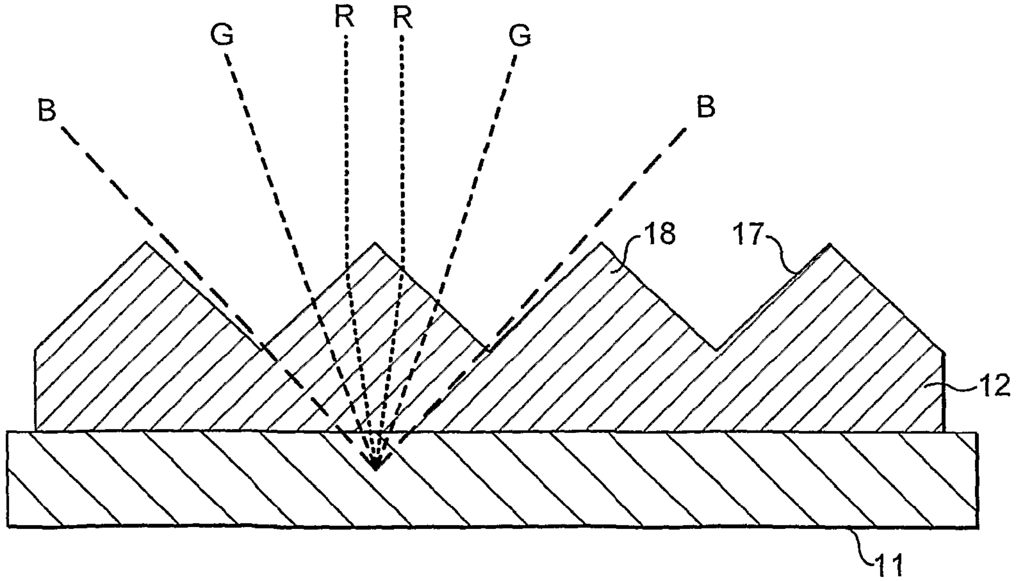
FIG. 3 is an enlarged section of the security device of FIG. 1 showing the modified reflection of light rays.

The light control layer 12 preferably has a microprismatic structure, which allows light rays which would normally be internally reflected in the liquid crystal layer 11, as shown in FIG. 2, to appear at acute angles of incidence (FIG. 3). For example, when the light control film 12 is applied to a red (R) to green (G) colourshifting liquid crystal layer 11, the liquid crystal layer 11 exhibits a red to green colourshift when viewed in reflection as the security device 10 is tilted away from the normal. When the security device 10 is tilted further still away from the normal, the liquid crystal layer 11 then exhibits a green to blue (B) colourshift.

The green reflected light will appear at a closer angle to normal incidence than it would without the light control film 12, as illustrated in FIGS. 2 and 3. This makes it easier for the authenticator to observe the colourshift.

Figure 10:
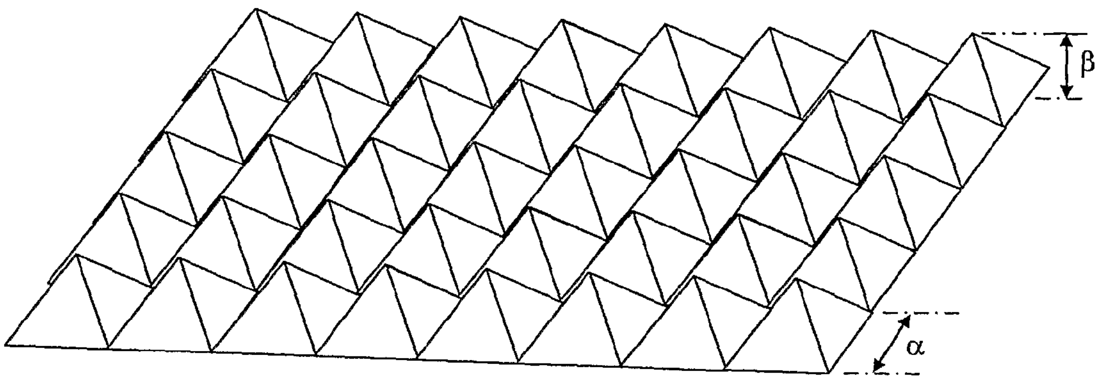
Figure 12:
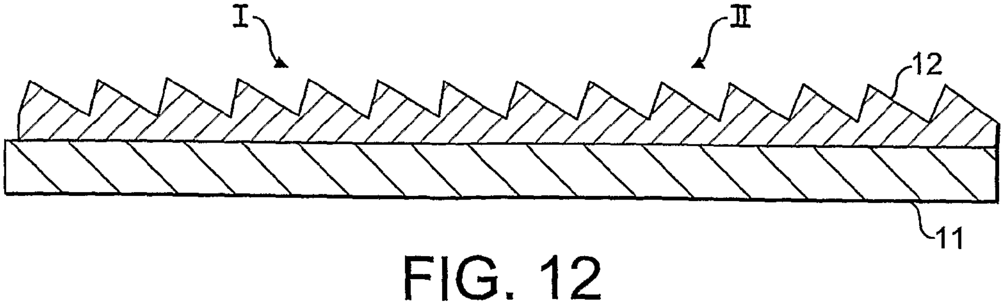
FIGS. 12 to 17 are cross-sectional side elevations of further alternative security devices according to the invention.

Examples of structures of the light control layer 12 suitable for the present invention include, but are not limited to, a series of parallel linear microprisms with planar facets arranged to form a grooved surface (as shown in FIG. 1), a ruled array of tetrahedra, an array of square pyramids (as shown in FIG. 10), an array of corner-cube structures, an array of hexagonal-faced corner-cubes and a saw-tooth microprismatic array (as shown in FIG. 12).

The angles at which the colourshifts appear are dependant upon both the angle which the microprismatic facets 17 make with the underlying colourshifting layer 11 and the refractive index of the material used to form the microprisms 18. The effect has been tested on arrays of parallel linear microprisms 18, in which the facets 17 makes an angle of approximately 45° with the surface of layer 11 and the angle between adjacent facets 17 is approximately 90°. Arrays with various pitch lengths (8, 16, 25 and 32 μm) have been assessed and there appears to be no significant difference in the effect seen in terms of colours reflected and the angle at which they appear. The pitch of the microprism array is preferably in the range 1-100 microns, and more preferably 5-40 microns, and the height of the microprisms is preferably in the range 1-100 microns, and more preferably 5-40 microns.

Figure 4:
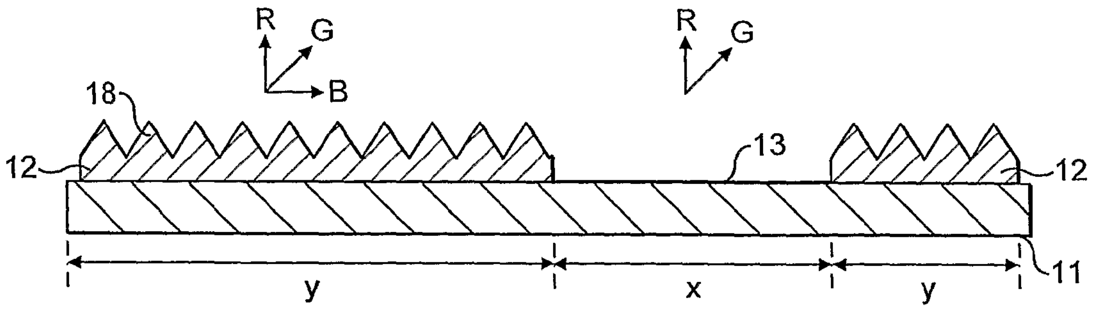
FIG. 4 is a cross-sectional side elevation of an alternative embodiment of the invention shown in FIG. 1.

To further improve the security and aesthetics of the security device 10, the light control layer 12 can be partially applied in a registered pattern, as shown in FIG. 4, having regions 13 containing no light control layer 12. For a liquid crystal layer 11 exhibiting a red to green colourshift where the light control layer 12 is present, the colour will shift from red to green and then to blue as the device 10 is tilted away from the normal as shown in Regions Y in FIGS. 5 and 6. In the other regions 13 which do not contain the light control film the colourshift will just be from red to green as for the conventional liquid crystal layer 11, as shown by Regions X in FIGS. 5 and 6. This enables the device 10 to reveal a latent image or pattern on tilting. Initially the device 10 will appear uniformly red when viewed at normal incidence, but on tilting to an acute angle regions of blue (Regions Y) and green (Regions X) will appear defined by the position of the light control layer 12.

For a security device 11 of the present invention containing a one-dimensional microprismatic structure, such as an array of linear microprisms 18, the observed effect depends on the angle of rotation of the device 10 in its plane, i.e. the observed optical effect is anisotropic. The blue reflected colour is seen most readily when the device 10 is tilted with the viewing direction perpendicular to the long axes of the linear microprisms 18. If the device 10 is tilted with the viewing direction parallel to the long axes of the linear microprisms 18 the effect is seen to a lesser degree.

Figure 7:
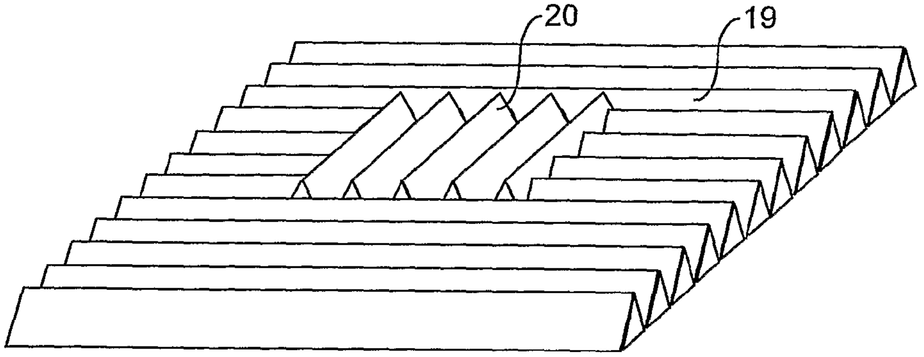
FIGS. 7 to 11 are schematic representations illustrating the effect of using a microprismatic film having linear prisms in different orientations and different formats.
Figure 8:
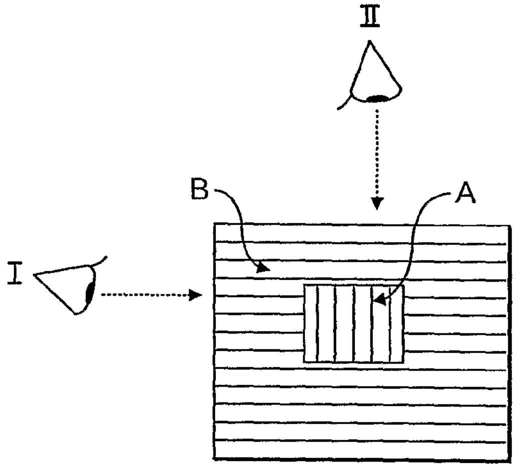

In a further embodiment the security device 10 comprises linear microprisms 18 in different orientations, as shown in FIGS. 7 and 8, where the arrays are in two orthogonal orientations. FIG. 7 shows two linear microprism arrays 19, 20 in which their long axes are oriented at 90° to each other. This provides a security device 10 with two distinguishable regions, Region A and Region B. Taking as an example a liquid crystal layer 11 exhibiting a red to green colourshift, when the security device 10 is viewed from point I at an acute angle (see FIG. 8). Region A appears blue and Region B appears green. If the device 10 is oriented so that it is viewed from point II, the colours switch and Region A appears green whilst Region B appears blue.

The security device 10 of the present invention can be viewed in reflection or transmission. If the device 10 is intended to be viewed in reflection, it is preferable to have an additional dark light-absorbing layer present under the colourshifting layer 11, especially when liquid crystal materials are used.

Whilst the use of a black, or very dark, substantially totally absorbing layer may give rise to the most strong colourshift effects, other effects may be generated by the use of an absorbing layer of other colours or a combination of colours, giving rise to differing apparent colourshift colours. The absorbing layers of the present invention may comprise a pigmented ink or coating or alternatively a non-pigmented absorbing dye can be used.

In one embodiment of the present invention, liquid crystal materials are selected for the colourshifting layer 11 such that at certain angles of view the reflected light is in the non-visible wavelengths of the electromagnetic spectrum. The use of polymer liquid crystals, where only one component of the colourshift is in the visible region of the electromagnetic spectrum, enables an image to be incorporated into the device 10 that only becomes apparent at certain angles of view. In this embodiment the liquid crystal material reflects infra-red light on axis and red at an acute angle. The use of a light control film 12 enables the liquid crystal layer 11 to exhibit visible colours that would not normally be seen.

Figure 9:
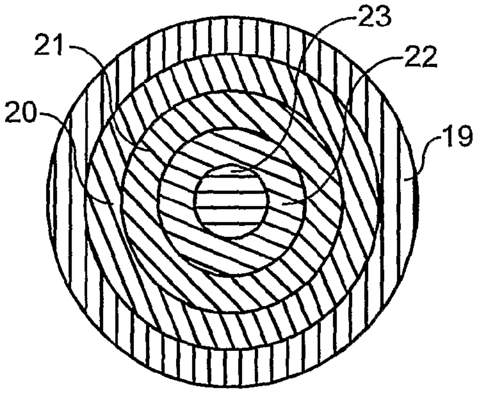

Using a light control film 12 comprising multiple arrays (19-23) of linear microprisms 18 where the long axes of each array is oriented at slightly different angles to each other (as shown in FIG. 9) many different colours can be seen as the device 10 is tilted at an angle away from the normal. At normal incidence the device 10 will appear colourless as the liquid crystal layer 11 only reflects infra-red light, or black if the layer 11 is over a dark light-absorbing absorbing layer. On tilting and rotating the device 10 different areas will be become coloured and switch to different colours at different viewing angles. The colours seen in the different areas will be dependant on the angle to which the device 10 has been tilted and the orientation of the microprisms 18. This is a particularly memorable effect as the device 10 switches from black or darkly coloured, due to the presence of the dark absorbing layer, to multicoloured on changing the viewing angle. The fact that different areas of the device 10 change colour at different angles provides a kinematic effect viewable across a wide range of angles which is simple to authenticate yet difficult to counterfeit.

To gain more isotropy in the optical properties of the security device 10, a light control film 12 can be selected which has optical properties which are not rotationally dependent. Such light control films 12 may, for example, have two-dimensional microprismatic structures such as square pyramids (as shown in FIG. 10) and corner-cubes.

Figure 11:
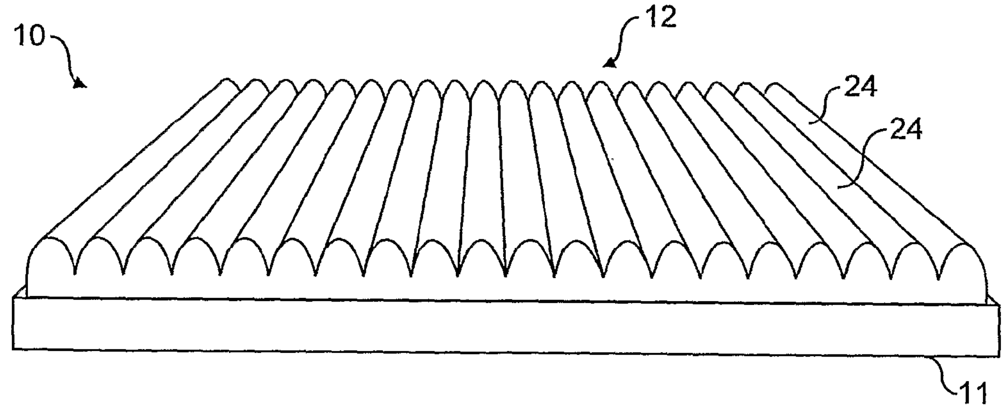

In FIG. 11 a light control layer 12 is used which has a structure which is similar to a microprismatic structure, but instead of microprisms comprises an array of lenticules 24 with a domed surface structure.

Figure 13:
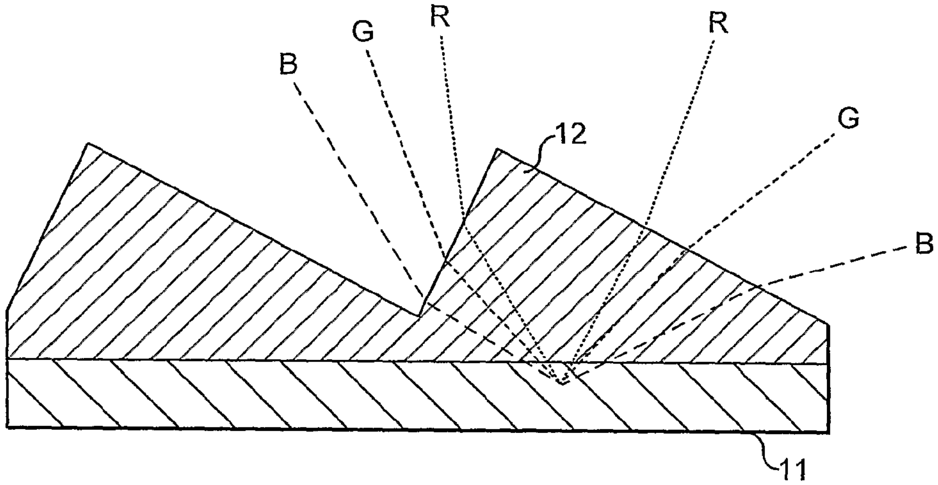

In FIGS. 12 and 13 a light control layer 12 is used which has a saw-tooth type structure which, when viewed from direction I, will give a colour-switch that occurs over a narrow angle tilt. Whereas, when viewed from direction II, the colour change occurs at a relatively large angle of tilt.

Figure 5:
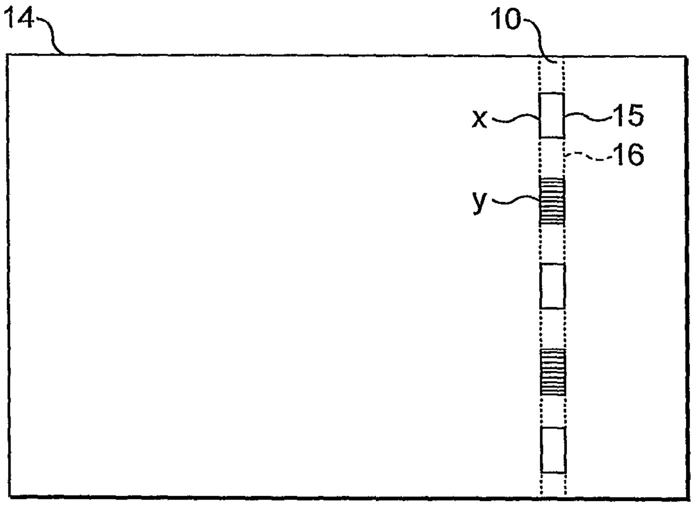
FIG. 5 is a plan view of a security substrate incorporating the security device of FIG. 4.
Figure 6:
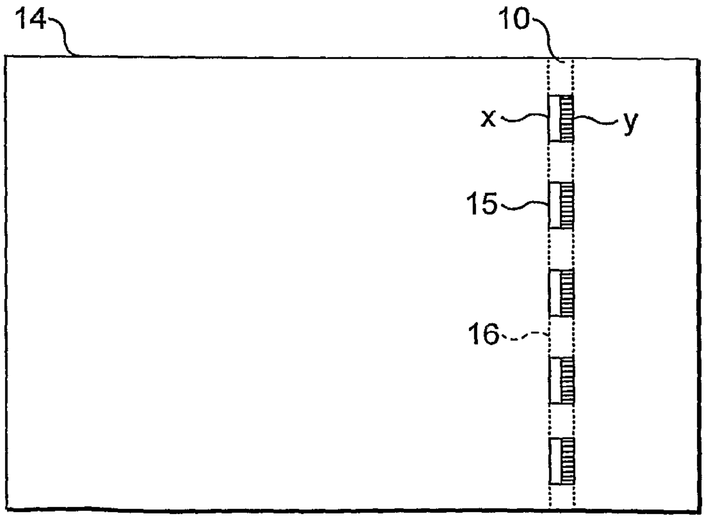
FIG. 6 is a plan view of an alternative security substrate incorporating an alternative security device according to the invention.
Figure 14:
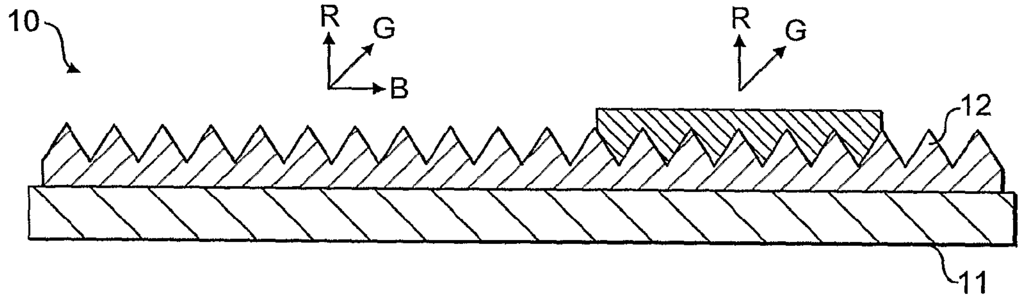

A similar effect to that achieved in FIGS. 4 to 6 can also be achieved by indexing out one or more regions of the light control layer 12 (see FIG. 14). The light control effect occurs due to a refractive index difference between the material of the light control layer 12 and air. If air is replaced with a resin which has substantially the same refractive index as the light control layer 12, the light rays will not be significantly refracted after being reflected from the surface. Hence the device 10 exhibits the normal optical effect observed with a conventional colourshifting layer 11. However, in the regions which have not been indexed out, the three way colourshift effect will still be visible. An advantage of this technique for security devices 10 is that the resin used to index out the light control layer 12 can also function as an adhesive. This has a double benefit of an aesthetic pattern and increased durability is observed.

There are a number of ways of manufacturing and applying the light control layer 12 to the colourshifting layer 12. In a first method, an all over UV curable resin coating is applied to the colourshifting layer 11. The colourshifting layer 11 is then held in intimate contact with a production tool in the form of an embossing cylinder, whereby the microprismatic structure defined on the production tool is replicated in the resin. Ultraviolet (UV) light is used at the point of contact to cure and harden the resin. UV casting of microprismatic structures is, for example, described in U.S. Pat. No. 3,689,346. Ideally the production tool is transparent (made from Quartz) and a UV light is positioned inside so that the UV resin is cured immediately after being cast.

Alternatively the prismatic film is formed on a carrier layer using the method described above and then transferred with the carrier layer in a separate process such that the carrier layer is adjacent to the colourshifting layer 11. Alternatively a pigmented colourshifting ink, for example a liquid crystal ink, is applied to the prismatic film.

With reference to the example in FIG. 4, the regions 13 containing no light control layer 12 may be formed by applying the UV curable resin over the whole surface and then using a patterned production tool to form the light control layer 12 in localised regions of the resin. In regions 13 there will simply be a planar coating of resin over the colourshifting layer 11, which will have no effect on its colourshifting properties.

In a second method, a light control layer 12 is formed which acts as a re-usable master, such that the expensive formation process only needs to be carried out once. The method of forming the master can be the method described above, for example. Onto this master is applied an all over coating of a heat sealable water based varnish (e.g. Acronal S 728 from BASF). The varnish has a low adhesion to the master. The master is then heat sealed/foil blocked onto the colourshifting layer 11 and, due to the low adhesion of the varnish to the master, it can be peeled away from the master which remincing adhered to the colourshifting layer 11. The structure of the master is replicated in the varnish, which forms the light control layer 12, and the master is then be available to use again and therefore keeping costs low.

Alternatively the light control layer is formed by coating the colourshifting layer 11 with a thermoplastic embossing lacquer and then using an embossing tool to create the light control structure with the application of heat and pressure.

Figure 15:
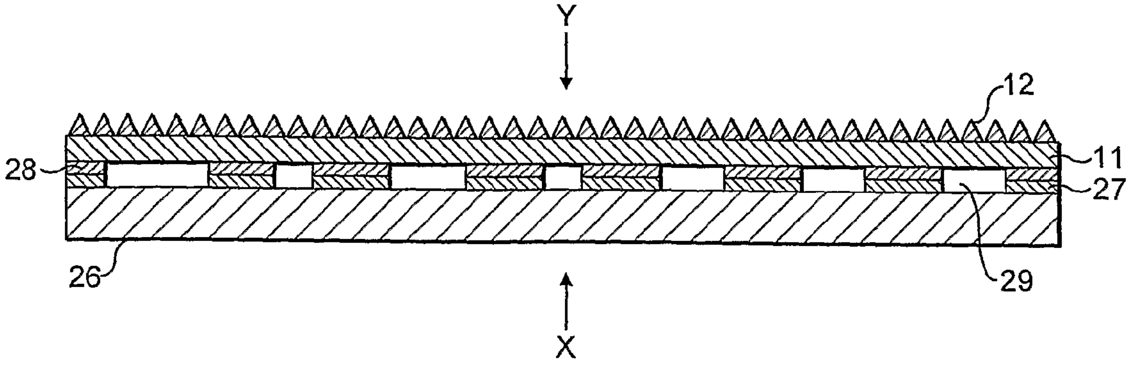

FIG. 15 illustrates how the security device 10 may be combined with demetallised indicia using the method described in WO-A-03061980 for application as a windowed security thread. The method requires a metallised film, comprising a substantially clear polymeric film 26 of PET or the like, which has an opaque layer of metal 27 on a first side thereof. A suitable pre-metallised film is metallised MELINEX S film from DuPont of, preferably, 19 μm thickness. The metal layer 27 is printed with a resist 28 which contains a black or dark dye or pigment. Suitable resists include the dye BASE Neozapon X51 or the pigment (well dispersed) "Carbon Black 7" mixed into a material with both good adhesion to metal and caustic resistance. The printed metallised film 26,27,28 is then partially demetallised, according to a known demetallisation process using a caustic wash which removes the metal 27 in the regions not printed with the resist 28. The remaining regions of metal 27, coated with resist 28, provide a partial black layer which is visible when the device 10 is viewed from its first side (along arrow Y) interspersed with clear demetallised regions 29. The shiny metal of the remaining regions of metal 27 are only visible from an opposite side of the device 10 (along arrow X).

The resist 28 may be printed in the form of the indicia such as words, numerals, patterns and the like; in which case the resulting indicia will be positively metallised, with the metal 27 still covered by the dark or black resist 28. Alternatively the resist 28 may be printed so as to form indicia negatively, in which case the resulting indicia will be provided by the demetallised regions 29. The indicia, however formed, are clearly visible from both sides, especially in transmitted light, due to the contrast between the regions 29 from which the metal has been removed and the remaining opaque metal regions 27. The colourshifting layer 11 and the light control layer 12 are then applied as described previously.

The security device 10 illustrated in FIG. 15 exhibits two visually contrasting security characteristics. The device 10 comprises the colourshift effects, as described in the previous embodiments, when the finished security substrate incorporating the security device 10 is viewed in reflection from the first side (along arrow Y); and a metallic shiny partial coating when viewed from the other side (along arrow X). Additionally clear positive or negative indicia, defined by the black resist 28, can be seen in transmission from either side. This embodiment is particularly advantageous when used for a device 10 that is viewable from both side of the substrate in which it is incorporated. For example the device 10 could be incorporated into a secure substrate/document using the methods described in EP-A-1141480 or WO-A03054297.

Security devices 10 comprising liquid crystal materials are inherently machine-readable due to the polarisation properties and wavelength selectivity of the liquid crystal materials. The machine readable-aspect of the security device 10 of the present invention can be extended further by the introduction of detectable materials in the existing liquid crystal, or alternate colourshifting materials, or an absorbing layer or by the introduction of separate machine-readable layers. Detectable materials that react to an external stimulus include, but are not limited to, fluorescent, phosphorescent, infrared absorbing, thermochromic, photochromic, magnetic, electrochromic, conductive and piezochromic materials.

In one preferred embodiment incorporating an absorbing layer, a pigment in the absorbing layer is machine readable, for example carbon black, to produce a machine-readable or conducting layer. Alternatively it may be a magnetic material or contain a magnetic pigment, such as magnetite, to produce a machine-readable magnetic layer or code.

In a further embodiment, only part of the absorbing layer may be provided with a magnetic pigment and the remainder is provided with a non-magnetic pigment. If both the magnetic and non-magnetic regions are substantially totally absorbing there will be no visual difference in the liquid crystal layer over the two regions and therefore the format of the code will not be readily apparent.

As a further alternative, security device 10 may incorporate a base layer carrier substrate of a polymeric material, such as Polyethylene Terephthalate (PET) or Bixally Oriented Polypropylene (BOPP). A magnetic material in the form of tramlines may be applied along both longitudinal edges of the carrier substrate. A suitable magnetic material is FX 1021 supplied by Ferron and this may be applied with a coat weight of, for example, 2-6 gsm. A uniform light-absorbing layer is applied over both the polymeric carrier substrate and the magnetic tramlines. The colourshifting and light control layers 11, 12 are then applied to the light-absorbing layer. The use of magnetic tramlines in this example is for illustrative purposes only, and the magnetic material may be applied in any design.

In an alternative machine-readable embodiment, a transparent magnetic layer can be incorporated at various positions within the structure of the device 10. Suitable transparent magnetic layers containing a distribution of particles of a magnetic material of a size and distributed in a concentration at which the magnetic layer remains transparent are described in WO-A-03091953 and WO-A-03091952.

As a further example, a machine-readable security device 10 may be combined with demetallised indicia. Such a device 10 comprises a metallised PET base substrate, demetallised to form the indicia, including tramlines of metal which are left along each edge of the device 10. The resist used during the demetallisation process is preferably black or dark coloured. A protective layer may be applied onto the metal tramlines to prevent the metal from being corroded by the magnetic layer which is applied next. A suitable protective layer is VHL31534 supplied by Sun Chemical applied with a coat weight of 2 gsm. The protective layer may optionally be pigmented. The magnetic material is only applied over the metal tramlines so as not to obscure the demetallised indicia. The colourshift film 11 and the light control film 12 are then applied as described previously.

The security device 10 can be incorporated in security substrates 14 used to make secure documents in any of the conventional formats known in the prior art, for example as patches, foils, stripes, strips or threads. The security device 10 can be arranged either wholly on the surface of the substrate 14, as in the case of a stripe or patch, or can be visible only partly on the surface of the substrate 14 in the form of a windowed security thread. Security threads are now present in many of the world's currencies as well as vouchers, passports, travellers' cheques and other documents. In many cases the thread is provided in a partially embedded or windowed fashion where the thread appears to weave in and out of the paper and is visible in windows 15 in one or both surfaces of the substrate 14. One method for producing paper with so-called windowed threads can be found in EP-A-0059056. EP-A-0860298 and WO-A-03095188 describe different approaches for the embedding of wider partially exposed threads into a paper substrate. Wide threads, typically having a width of 2-6 mm, are particularly useful as the additional exposed thread surface area allows for better use of optically variable devices, such as that used in the present invention. FIGS. 5 and 6 show the security device 10 of the present invention incorporated into a security substrate 14 as a windowed thread with windows 15, in which areas of the device 10 are exposed whilst the remaining areas of the device 10 are embedded under bridges 16 between the windows 15.

In a further embodiment of the invention, the device 10 is incorporated into a substrate 14 such that regions of the device 10 are visible from both sides of the substrate 14. Suitable methods of incorporating a security device 10 in this manner are described in EP-A-1141480 and WO-A-3054297. In the method described in EP-A-1141480 one side of the device is wholly exposed at one surface of the substrate in which it is partially embedded, and partially exposed in windows at the other surface of the substrate.

An advantage of the device 10 of the present invention, which can be viewed from both sides of the substrate, is that different colourshifts will be observed on either side of the device 10. For example when the device 10 of FIG. 1 is viewed from the side where the light control layer 12 is outermost, a red to green to blue colourshift is observed on tilting away from normal incidence. However when viewed from the opposite side, where the colourshifting layer 11 is outermost, a red to green colourshift is observed on tilting away from normal incidence.

In the case of a stripe or patch, the security device 10 is prefabricated on a carrier strip and transferred to the substrate 14 in a subsequent working step. The security device 10 can be applied to the substrate 14 using an adhesive layer, which is applied either to the security device 10 or the surface of the substrate 14. After transfer, the carrier strip is removed leaving the security device 10 exposed. Alternatively the carrier strip can be left in place to provide an outer protective layer.

The security device 10 may be used in combination with other existing approaches for the manufacture of secure substrates and documents. Examples of suitable methods and constructions that can be used include, but are not limited to, those described in WO-A-03061980, EP-A-516790, WO-A-9825236, and WO-A-9928852.

Following the application/incorporation of the security device 10, security substrates 14 generally undergo further standard security printing processes including one or more of the following; wet or dry lithographic printing, intaglio printing, letterpress printing, flexographic printing, screen-printing, and/or gravure printing. In a preferred embodiment, and to increase the effectiveness of the security device 10 against counterfeiting, the design of the security device 10 can be linked to the finished secure document it is protecting by content and registration to the designs and identifying information provided on the document.

An adhesive layer may be applied to the outer surfaces of the device 10 to improve adherence to the security substrate 14. If the adhesive layer is applied to the surface of the device 10 comprising the light control layer 12, then there must be a refractive index difference between the adhesive layer and the light control layer 12. Applying an adhesive layer, or a protective polymeric layer, onto the light control layer 12 is advantageous in that it prevent soil accumulating in the troughs of the light control film 12.

In an alternative embodiment of the present invention multiple colourshifting layers exhibiting different colourshifting properties may be used either adjacent to each other within the same layer of the device, or as a multilayer structure. These are preferably layers of liquid crystal materials, although the colourshifting materials and structures can be used.

Figure 16:
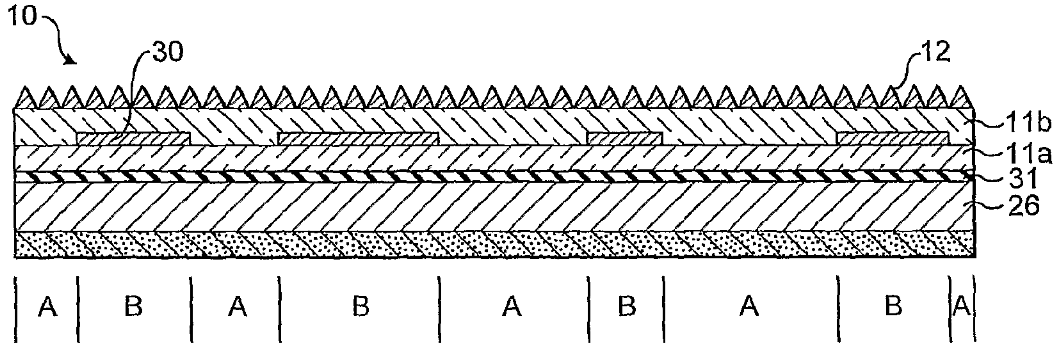

In the example shown in FIG. 16 the security device 10 comprises a first layer 11*a* of an optically variable liquid crystal material and a second layer 11*b* of an optically variable liquid crystal material, which exhibits different reflective characteristics to the first layer 11*a*. A partial absorbing layer 30 is applied between the first and second liquid crystal layers 11*a* and 11*b*. A light control layer 12, comprising a series of parallel linear microprisms, is applied to the second liquid crystal layer 11*b*. The light control layer 12 may be a partial layer, as described in reference to FIG. 4, or a full layer. If the device 10 is intended to be viewed in reflection, it is preferable to have an additional dark absorbing layer 31 present under the first liquid crystal layer 11*a*.

The application of a partial absorbing layer 30 between the two liquid crystal layers 11*a*, 11*b* creates two optically variable regions, Regions A and B. In Region A there is no absorbing layer 30 between the two liquid crystal layers 11*a*, 11*b* such that the wavelength of reflected light, at any given angle of incidence, is a result of the additive mixing of the individual wavelengths of light reflected from the two liquid crystal layers 11*a*, 11*b*. In Region B there is an absorbing layer 30 between the two liquid crystal layers and the wavelength of reflected light, at any given angle of incidence, is solely the reflected light from the second liquid crystal layer 11*b*.

Figure 17:
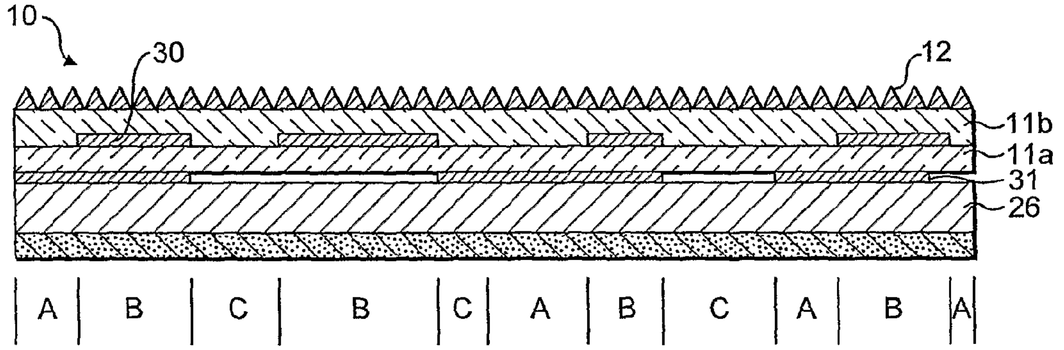

The absorbing layer 31 which lies under the first liquid crystal film layer 11*a* may be applied in the form of a design, creating a further optically variable Region C, as shown in FIG. 17. In Region C there is no absorbing layer under either of the liquid crystal layers 11*a*, 11*b* and when the device 10 is positioned on a reflective background, the intensity of the transmitted colour reflected back through the liquid crystal layers 11*a*, 11*b* saturates the reflective colour. The transmitted and reflected colours are complementary, for example, a red to green colourshift in reflection is seen as a cyan to magenta colourshift in transmission. When the security device 10 is applied to a predominantly white substrate, then the light transmitted through Region C gives the underlying substrate a noticeable tint of colour which is the complementary colour to the observed reflected colour in Region A.

In one example, illustrated in FIGS. 18*a* and 18*b*, and referring to the cross-section in FIG. 16, the first liquid crystal layer 11*a* reflects light in the infrared region of the electromagnetic spectrum when at normal incidence (FIG. 18*a*), appearing colourless and transparent, and reflects red light when tilted away from normal incidence (FIG. 18*b*). The second liquid crystal layer 11*b* exhibits a red-green colourshift when viewed against a dark absorbing background. Regions A and B are defined by the partial dark absorbing layer 30 between the two liquid crystal layers 11*a*, 11*b* which, in this example, is applied in the form of alphanumeric characters such that Region B is a repeating pattern of the words DE LA RUE and Region A is the background. When viewed in reflection and at normal incidence both Regions A and B will appear red due to the transparent colourless appearance of the first liquid crystal layer 11*a* having no visible effect on the appearance of the device 10. On tilting the device 10, such that it is viewed away from normal incidence, Region A appears yellow, due to the additive colour mixing from the red reflected light from the first liquid crystal layer and the green reflected light from the second liquid crystal layer 11*b*, and Region B appears green due to the reflected light coming solely from the second liquid crystal layer 11*b*. To the authenticator the device 10 appears uniformly red at normal incidence, but on tilting away from normal incidence the repeating legend DE LA RUE appears in a yellow colour against a green background.

The presence of the light control film 12 in the security device 10 of FIGS. 18*a* and 18*b* means that the observed colourshifts for the two liquid crystal layers 11*a*, lib occurs at a closer angle to normal incidence than it would without the light control film 12. Therefore the appearance of the hidden image, in this case the repeating legend DE LA RUE, occurs at a viewing angle closer to normal incidence making it significantly easier for the authenticator to observe the image and therefore verify the device 10.

A further advantage of the light control film 12 is that as the device 10 is tilted away from normal incidence wavelengths of light, that are otherwise internally reflected within the liquid crystal layers 11*a*, 11*b*, start to contribute to the overall colour of the feature. For example the first liquid crystal layer 11*a* reflects light in the infrared region of the electromagnetic spectrum when at normal incidence (FIG. 18*a*), appearing colourless and transparent, and reflects red light when tilted away from normal incidence (FIG. 18*b*). However due to the presence of the light control film 12 on tilting further away from normal incidence the first liquid crystal layer 11*a* is seen to reflect light in the green region of the electromagnetic spectrum. The second liquid crystal layer 11*b* exhibits a red-green colourshift on tilting away from normal incidence, however due to the presence of the light control film 12 on tilting further away from normal incidence the second liquid crystal layer 11*b* is seen to reflect light in the blue region of the electromagnetic spectrum. For the example shown in FIGS. 18*a* and 18*b*, a red to green colourshift is observed in Region B on tilting the device a small distance away from normal incidence and a red to yellow colourshift is observed in Region A revealing a hidden yellow image on a green background as described. On further tilting a further colourshift from green to blue is observed in Region B and a further colourshift from yellow to cyan is observed in Region A due to the additive colourmixing of the green and blue colours from the first and second liquid crystal layers 11*a*, 11*b*. In this manner the hidden image will be revealed on tilting as a yellow image against a green background and then on further tilting change to a cyan image on a blue background. This further colourshift provides an additional challenge for the counterfeiter in replicating the security feature.

In a further embodiment to that illustrated in FIG. 16 one or both of the liquid crystal layers 11*a*, 11*b* is a partial layer. This can be achieved by gravure printing the liquid crystal material onto the carrier substrate 26 or onto the first liquid crystal layer 11*a* using a printable polymerisable liquid crystal material as described in US-A-20040155221. For example if the second liquid crystal layer 11*b* is a partial layer, such that in certain regions the first liquid crystal layer 11*a* is exposed, then a further optically variable region can be created in which the wavelength of reflected light, at any given angle of incidence, is solely the reflected light from the first liquid crystal layer 11*a*.

An alternative method of forming a partial second liquid crystal layer 11*b* is to remove regions of the exposed second liquid crystal layer 11*b* once the multilayer device 10 has been formed. This can be achieved by creating a weak interface between the partial absorbing layer 30 and the first liquid crystal layer 11*a*. If a mechanical force is applied such that the second liquid crystal layer 11*b* is pulled away from the first liquid crystal layer 11*a* it will be removed along with the absorbing layer 30 only in the regions where this weak interface exists.

FIG. 19 shows an embodiment comprising a partial first liquid crystal layer 11*a*. A first liquid crystal layer 11*a*, with the same angular dependent reflection characteristics as liquid crystal layer 11 in FIG. 16, is printed (directly or indirectly) onto a polymeric carrier substrate 26 in the form of a design for example alphanumeric characters such that Region B is a repeating pattern of the words DE LA RUE and Region A is the background. A second liquid crystal layer 11*b*, with the same angular dependent reflection characteristics as the second liquid crystal layer 11*b*, in FIG. 16, is then applied as a full layer overlapping the polymeric carrier 16 and the first liquid crystal layer 11*a*. A light control layer 12, comprising a series of parallel linear microprisms, is applied to the second liquid crystal layer 11*a*. If the device 10 is intended to be viewed in reflection, then it is preferable to have an additional dark absorbing layer 31 present under the first liquid crystal layer 11*a*.

In Region A the wavelength of reflected light, at any given angle of incidence, is a result of the additive mixing of the individual wavelengths of light reflected from the two liquid crystal layers 11*a*,11*b*. In Region B the first liquid crystal layer 11*a* has been omitted and the wavelength of reflected light, at any given angle of incidence, is solely the reflected light from the second liquid crystal layer 11*b*. The optical effect of the security device 10 in FIG. 19 is therefore the same as that observed for the device 10 in FIG. 16 but has been produced in a different manner.

In the examples shown in and described with reference to FIGS. 16-19 other light control layers and colourshifting materials may be used such as are described in the earlier examples.

The invention claimed is:

1. A security device, said device comprising:

a first and a second layer of a colourshifting material at least partially overlying each other and each having different colourshifting properties; and, at least partially applied over an exposed surface of one of the colourshifting layers, a light control layer having a surface structure which modifies an angle of reflected light such that light reflected by the colourshifting layers is seen at different viewing angles.

2. A security device as claimed in claim 1 further comprising, in at in least one region, a light absorbing layer between the two colourshifting layers.

3. A security device as claimed in claim 1 wherein the colourshifting layers are selected from the group comprising a thin film interference structure, a multilayer polymeric structure, a photonic crystal structure and a liquid crystal layer.

4. A security device as claimed in claim 3 wherein the liquid crystal layer is selected from the group comprising a coating of pigmented liquid crystal material on a polymeric carrier layer and a liquid crystal film.

5. A security device as claimed in claim 1 wherein the light control layer is a microprismatic film.

6. A security device as claimed in claim 5 wherein the microprismatic film has a one dimensional microprismatic structure.

7. A security device as claimed in claim 5 wherein the microprismatic film has a two dimensional microprismatic structure.

8. A security device as claimed in claim 1 wherein the light control layer comprises an array of lenticules with a domed surface structure.

9. A security device as claimed in claim 1 wherein at least one region of the light control layer is indexed out using a material having substantially the same refractive index as the light control layer.

10. A security device as claimed in claim 9 wherein the at least one indexed out region defines indicia.

11. A security device as claimed in claim 1 wherein the light control layer is a partial layer having at least one blank area in which no light control layer is present.

12. A security device as claimed in claim 11 wherein the at least one blank area defines indicia.

13. A security device as claimed in claim 1 further comprising a further layer of a light absorbing material applied to a surface at least one of the colourshifting layers on an opposite side to the light control film.

14. A security device as claimed in claim 1 wherein the colourshifting layers are supported by a polymeric carrier layer.

15. A security device as claimed in claim 14 further comprising metallised or demetallised indicia defined by metal regions applied to either side of the polymeric carrier layer.

16. A security device as claimed in claim 15 wherein the machine readable element is selected from the group comprising a fluorescent, phosphorescent, infra-red absorbing, thermochromic, photochromic, magnetic, electrochromic, conductive and piezochromic material.

17. A security device as claimed in claim 1 further comprising a machine readable element.

18. A security device as claimed in claim 1 wherein one or both of the colourshifting layer(s) is a partial layer.

19. A secure substrate comprising a base substrate and security device as claimed in claim 1.

20. A secure substrate comprising a base substrate and a security device as claimed in claim 1 wherein the security device is applied to a surface of the base substrate.

21. A secure substrate comprising a base substrate and security device as claimed in claim 1 wherein the security device is at least partially embedded in the base substrate and visible in windows in at least one surface of the base substrate.

22. A security document formed from the secure substrate comprising a base substrate and a security device as claimed in claim 1 comprising a voucher, passport, banknote, cheque, certificate or other document of value.

23. A secure substrate comprising a base substrate and security device as claimed in claim 1.

24. A security device comprising a layer of colourshifting material and, at least partially applied over a first surface of the colourshifting layer, a light control layer having a surface structure which modifies the angle of light reflected by the security device, in which at least one region of the light control layer is indexed out using a material having substantially the same refractive index as the light control layer.

25. A security device as claimed in claim 24 wherein the colourshifting layer is selected from the group comprising a thin film interference structure, a multilayer polymeric structure, a photonic crystal structure and a liquid crystal layer.

26. A security device as claimed in claim 25 wherein the liquid crystal layer is selected from the group comprising a coating of pigmented liquid crystal material on a polymeric carrier layer and a liquid crystal film.

27. A security device as claimed in claim 24 wherein the light control layer is a microprismatic film.

28. A security device as claimed in claim 27 wherein the microprismatic film has a one dimensional microprismatic structure.

29. A security device as claimed in claim 27 wherein the microprismatic film has a two dimensional microprismatic structure.

30. A security device as claimed in claim 24 wherein the light control layer comprises an array of lenticules with a domed surface structure.

31. A security device as claimed in claim 24 wherein the light control layer is a partial layer having at least one blank area in which no light control layer is present.

32. A security device as claimed in claim 31 wherein the at least one blank area defines indicia.

33. A security device as claimed in claim 24 further comprising a further layer of a light absorbing material applied to a surface of the colourshifting layer on an opposite side to the light control film.

34. A security device as claimed in claim 24 wherein the colourshifting layer is supported by a polymeric carrier layer.

35. A security device as claimed in claim 34 further comprising metallised or demetallised indicia defined by metal regions applied to either side of the polymeric carrier layer.

36. A security device as claimed in claim 24 further comprising a machine readable element.

37. A security device as claimed in claim 24 wherein the machine readable element is selected from the group comprising a fluorescent, phosphorescent, infra-red absorbing, thermochromic, photochromic, magnetic, electrochromic, conductive or piezochromic material.

38. A secure substrate comprising a base substrate and a security device as claimed in claim 24 wherein the security device is applied to a surface of the base substrate.

39. A secure substrate comprising a base substrate and security device as claimed in claim 24 wherein the security device is at least partially embedded in the base substrate and visible in windows in at least one surface of the base substrate.

40. A security document formed from the secure substrate comprising a base substrate and a security device as claimed in claim 24 comprising a voucher, passport, banknote, cheque, certificate or other document of value.

41. A security device comprising a layer of colourshifting material and, at least partially applied over a first surface of the colourshifting layer, a light control layer having a surface structure which modifies the angle of light reflected by the security device, the colourshifting material being selected such that, at certain angles of view, the light reflected by the colourshifting material is in the non-visible region of the electromagnetic spectrum and at least one other angle the reflected light is in the visible spectrum.

42. A security device as claimed in claim 41 wherein the colourshifting layer is selected from the group comprising a thin film interference structure, a multilayer polymeric structure, a photonic crystal structure, and a liquid crystal layer.

43. A security device as claimed in claim 42 in which the liquid crystal layer is selected from the group comprising a coating of pigmented liquid crystal material on a polymeric carrier layer and a liquid crystal film.

44. A security device as claimed in claim 41 wherein the light control layer is a microprismatic film.

45. A security device as claimed in claim 44 wherein the microprismatic film has a one dimensional microprismatic structure.

46. A security device as claimed in claim 45 wherein the microprismatic film has a two dimensional microprismatic structure.

47. A security device as claimed in claim 41 wherein the light control layer comprises an array of lenticules with a domed surface structure.

48. A security device as claimed in claim 41 wherein at least one region of the light control layer is indexed out using a material having substantially the same refractive index as the light control layer.

49. A security device as claimed in claim 48 wherein the indexed out area defines indicia.

50. A security device as claimed in claim 41 wherein the light control layer is a partial layer having at least one blank area in which no light control layer is present.

51. A security device as claimed in claim 50 in which the at least one blank area defines indicia.

52. A security device as claimed in claim 41 further comprising a further layer of a light absorbing material applied to a surface of the colourshifting layers on an opposite side to the light control film.

53. A security device as claimed in claim 41 wherein the colourshifting layer is supported by a polymeric carrier layer.

54. A security device as claimed in claim 53 further comprising metallised or demetallised indicia defined by metal regions applied to either side of the polymeric carrier layer.

55. A security device as claimed in claim 41 further comprising a machine readable element.

56. A security device as claimed in claim 41 wherein the machine readable element is selected from a group comprising a fluorescent, phosphorescent, infra-red absorbing, thermochromic, photochromic, magnetic, electrochromic, conductive and piezochromic material.

57. A secure substrate comprising a base substrate and security device as claimed in claim 41.

58. A secure substrate comprising a base substrate and a security device as claimed in claim 41 wherein the security device is applied to a surface of the base substrate.

59. A secure substrate comprising a base substrate and security device as claimed in claim 41 wherein the security device is at least partially embedded in the base substrate and visible in windows in at least one surface of the base substrate.

60. A security document formed from the secure substrate comprising a base substrate and a security device as claimed in claim 41 comprising a voucher, passport, banknote, cheque, certificate or other document of value.

* * * * *